Figure 1:
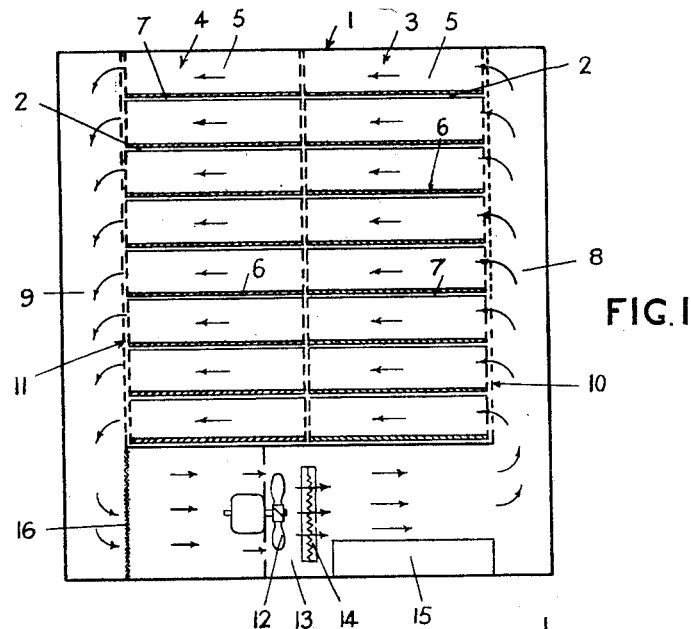

May 7, 1957    J. HAMNETT    2,791,199
HATCHING DEVICE FOR INCUBATED EGGS
Filed Aug. 11, 1955

INVENTOR
JAMES HAMNETT
BY Robb & Robb
ATTORNEYS

United States Patent Office 2,791,199
Patented May 7, 1957

2,791,199

HATCHING DEVICE FOR INCUBATED EGGS

James Hamnett, Broughton, Preston, England

Application August 11, 1955, Serial No. 527,731

1 Claim. (Cl. 119—35)

This invention is concerned with the provision of an improved hatching device to receive incubated eggs and within which the eggs may be allowed to hatch.

It is well known that incubators are now in use with a very substantial egg capacity. It is not unusual for some thousands of eggs to be incubated in banks or racks in close contact with one another. Obviously it would be quite impracticable to allow the eggs to hatch in the same position in which they are incubated and therefore it is usual to provide either a separate hatching chamber or an entirely separate hatching device.

Generally speaking known hatching devices comprise a closed chamber to receive racks of incubated eggs and associated fans usually at each side of the racks of eggs to cause turbulence of the air within the chamber. This arrangement certainly gives results and chicks are hatched, but my experiments have shown me that it is an inefficient method simply to cause turbulence of the air. I find that the eggs in some racks consistently give better results in numbers successfully hatched than the eggs in other racks and I believe that this is due to the fact that the air within the chamber is simply thrashed. It does not take up any definite path or paths, it may flow around some eggs and not around others. It is important that supplies of fresh warm air are brought into intimate contact with the eggs during hatching.

It is an object of the present invention to provide an improved form of hatcher.

According to a feature of the present invention I provide a hatcher for eggs comprising a container with a chamber to receive trays of incubated eggs, means to warm the air within the chamber and means to cause a positive circulation of the warm air within the chamber over and between the trays of eggs in such a manner that the air forms a stream or streams and follows a well defined circulatory path within the chamber instead of simply being in a state of turbulence. I prefer to construct the hatching trays in such a way that the bottom of each tray is of solid construction one tray being spaced apart from a superposed tray in a tier in such a way that the air streams are directed between the superposed trays. I prefer to provide a single fan or the equivalent below the trays and arranged to drive the air through a heater and then up a space provided at one side of the tier of trays. This gives a positive driving force to the air in the required direction. The fan exerts a suction effect upon a space at the other side of the tier of trays so that the air is not only driven up one side but it is sucked down the other side and in this way the air is caused to stream between the superposed trays and over the eggs.

According to another feature of the invention I provide air filtering means in the circulatory path into which the air is directed the arrangement being such that the air passes through the filtering means once during each circulation. This has a considerable advantage because fluff and other matter which might be injurious to hatching birds is eliminated. I may also provide a humidifier arranged to keep the humidity of the air in the chamber within desired limits. Naturally I provide an air inlet and an air outlet so that a supply of fresh air is provided and stale air is exhausted. It is therefore a feature of the invention that the air is heated and conditioned in a compartment inside the hatcher separate and distinct from the chamber within which hatching is effected although naturally the conditioning compartment is connected with the hatching chamber so that the air may take up its circulatory path.

Figure 2:
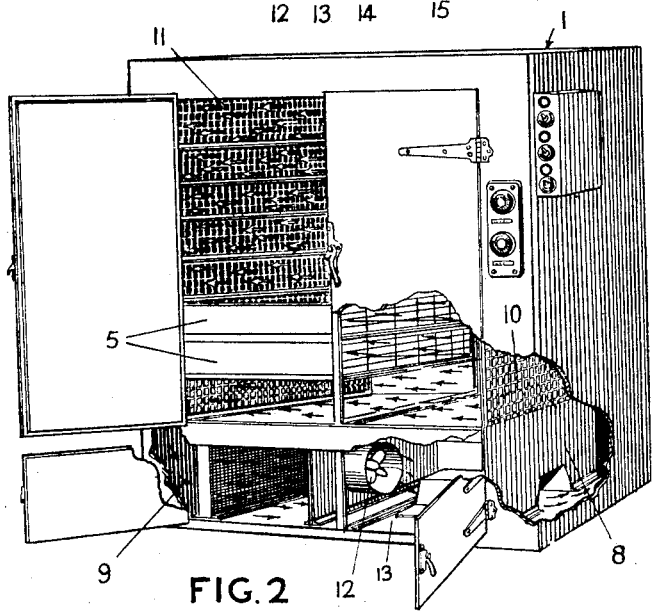

In order that the invention may be clearly understood, reference is now directed by way of example to the accompanying diagrammatic drawings in which:

Figure 1 is a vertical section taken on the longitudinal center line of a hatcher embodying the invention, and Figure 2 is a perspective view of the hatcher.

In one construction according to the invention described by way of example I may provide a rectangular container 1 having racks 2 at the centre thereof to receive two tiers 3, 4 of superposed egg hatching trays 5. The bottom 6 of each tray 5 is solid and impermeable and the trays 5 are spaced apart so that there is a space 7 between adjacent superposed trays 5. There is also a space 8, 9 down each side of the tiers of trays 5. The hatching chamber may be bounded at each side and separated from the space 8, 9 referred to above on each side by a perforated sheet 10, 11 or the equivalent and the perforations may be so adjusted as to ensure as far as possible that the streams of air passing between the superposed trays 5 are of substantially equal proportions. To this end the sheet 10 through which the air is driven may have large perforations at the bottom and small perforations at the top. The reason for this is that the air driven into the space 8 at the side of the tiers of trays may tend to follow a straight path up the side to the top and this might lead to a larger stream of air passing between the trays 5 at the top than at the bottom. A reverse situation obtains at the other or suction side. I prefer to provide a sheet 11 at the suction side with large perforations at the top and small perforations at the bottom to increase the suction at the top.

A fan 12 or other driving means is disposed below the tiers of trays 5 in a separate compartment 13 and is arranged to drive air through heating elements 14 and over or through a suitable humidifier 15 which may for example be a humidity tank in which water is allowed to percolate on to a cloth or any other suitable means. An air cleaner 16 is provided in what amounts to a conditioning compartment at the suction side so that the air is drawn through the air cleaner 16 which may be a fine wire grille or gauze or a special form of air filtering means.

What I claim is:

A hatcher for eggs comprising a container, a hatching chamber within the container to receive superposed trays of incubated eggs, a space within the container down each side of the hatching chamber, means to cause a positive circulation of air within the chamber over and between the trays of eggs in such a manner that the air forms a stream or streams and follows a well defined circulatory path and perforated sheets bounding the hatching chamber at each side through which air is driven from the space into the hatching chamber at one side and out of the hatching chamber into the space at the other side, characterised in this that the bottom of each tray is solid and impermeable and that the sheet through which air is driven into the hatching chamber has larger perforations at the bottom than at the top while the sheet through which air is sucked out of the hatching chamber has larger perforations at the top than at the bottom to ensure as far as possible that streams of air pass along between the trays of eggs and in substantially equal proportions.

References Cited in the file of this patent

UNITED STATES PATENTS

| | | |
|---|---|---|
| 1,848,409 | Biggins | Mar. 8, 1932 |
| 2,176,484 | Blakeslee | Oct. 17, 1939 |
| 2,184,685 | Brace | Dec. 26, 1939 |